US006047603A

United States Patent [19]
Ohtera et al.

[11] Patent Number: 6,047,603

[45] Date of Patent: Apr. 11, 2000

[54] ULTRASONIC SENSOR

[75] Inventors: Shozo Ohtera, Otsu; Hidetoshi Iwatani, Shiga-ken; Satoru Hachinohe, Yokaichi; Koichi Nitta, Omihachiman, all of Japan

[73] Assignee: Murata Manufacturing Co., Ltd., Japan

[21] Appl. No.: 09/226,393

[22] Filed: Jan. 6, 1999

[30] Foreign Application Priority Data

Jan. 13, 1998 [JP] Japan .................................. 10-004882
Aug. 25, 1998 [JP] Japan .................................. 10-238823

[51] Int. Cl.$^{7}$ ..................................................... G01H 11/00

[52] U.S. Cl. .............................. 73/649; 73/652; 310/322; 310/324

[58] Field of Search .............................. 73/649, 650, 651, 73/652, 661, 431; 310/322, 324, 335, 346; 367/157, 159, 165

[56] References Cited

U.S. PATENT DOCUMENTS 4,228,379 10/1980 Guscott et al. ......................... 310/322
4,240,002 12/1980 Tosi et al. ............................... 310/322
4,641,054 2/1987 Takahata et al. ....................... 310/322
4,705,981 11/1987 Inoue et al. ............................ 310/322
4,823,041 4/1989 Inoue et al. ............................ 310/322
5,495,766 3/1996 Kota et al. ............................... 73/652

*Primary Examiner*—Hezron Williams
*Assistant Examiner*—Helen C. Kwok
*Attorney, Agent, or Firm*—Ostrolenk, Faber, Gerb & Soffen, LLP

[57] ABSTRACT

An ultrasonic sensor includes: a floored cylindrical case, a piezoelectric vibration element and input-output terminals. The floored cylindrical case has a separately prepared cylinder part and a separately prepared vibration part, and the cylinder part and the vibration part are adhered together with an adhesive material having an elastic modulus in the range from 100 through 20,000 kgf/mm$^2$ at a temperature range from 25 through 125° C. The piezoelectric vibration element is disposed on the inner bottom floor of the floored cylindrical case. The input-output terminals are electrically connected to the piezoelectric vibration element and are adapted for electrical connection to outside of the floored cylindrical case.

14 Claims, 12 Drawing Sheets

ULTRASONIC SENSOR

BACKGROUND OF THE INVENTION

1. Field of the Invention

The present invention relates to an ultrasonic sensor, especially to a waterproof ultrasonic sensor used for a back sonar and corner sonar of automobiles.

2. Description of the Related Art

Recently, demands for waterproof ultrasonic sensors for sensing short distance objects that come close to the sensor are increasing in the application field of ultrasonic sensors.

An ultrasonic sensor with a construction as shown in FIG. 17 has been used for the purposes described above. The ultrasonic sensor 51 has a construction in which a piezoelectric vibration element 53, on both main faces of which element electrodes (not shown in the drawing) are formed, is adhered at the inside of a vibration part (bottom face) 54 of a floored cylindrical case 52*a* that is integrally formed of a metal, such as aluminum, by a cylinder part 55 and the vibration part 54. Electrical connection from the element electrode formed on the piezoelectric vibration element 53 to the outside of the case 52*a* is achieved via input-output terminals 58*a* and 58*b*. The input-output terminal 58*a* is connected to the element electrode formed on the main face at the side (top face side) not making contact with the vibration part 54 of the piezoelectric vibration element 53 by, for example, soldering. The input-output terminal 58*b* is connected to a prescribed position of the metal case 52*a* which is in electric connection with the element electrode formed on the main face at the side (bottom face side) making contact with the vibration part 54 of the piezoelectric vibration element 53 by, for example, soldering. The construction as described above allows electrical connection from the element electrodes to be formed with the input-output terminals 58*a* and 58*b*.

A soft and fine copper wire is used for the wiring material of the input-output terminals 58*a* and 58*b*. If a highly rigid wiring material, such as a lead frame comprising, for example, an iron-nickel alloy is used for the input-output terminal, then the input-output terminal is inserted from the opening of the cylindrical case 52*a* toward the vibration part 54 to achieve electrical connection by pressing the tip of the input-output terminal into contact with the piezoelectric vibration element 53. However, if the piezoelectric vibration element is pressed down with the input-output terminal, it results in inhibition (restriction) of naturally required vibration of the element 53. Moreover, when a highly rigid wiring material makes a press-contact with the piezoelectric vibration element 53, vibration of the piezoelectric element leaks out of the inner/outer part of the case through the input-output terminal—so called "leaky vibration"—causing deterioration of reverberation characteristic of the ultrasonic sensor. Therefore, a soft and fine wire has been used for the input-output terminal for these reasons.

A vibration suppressing material such as a silicone resin (not shown) is usually inserted into the empty space inside of the cylindrical case of the foregoing ultrasonic sensor 51.

The ultrasonic sensor with the construction as described above operates as follows. Firstly, a driving voltage is applied to the input-output terminals 58*a* and 58*b* to allow the piezoelectric vibration element 53 to vibrate. This vibration forces the vibration part 54 of the floored cylindrical case 52 to vibrate, emitting an ultrasonic wave toward the direction indicated by the arrow in FIG. 17. After a prescribed time interval, the ultrasonic wave reflected back from the sensed object arrives at the piezoelectric vibration element 53 via the vibration part 54 and is converted into a reflection signal, followed by output of output signals from the input-output terminals 58*a* and 58*b*. Then, the time interval from application of the driving voltage through the output of the reflection signals is detected, thereby measuring the distance between the sensor and the sensed object.

Conventional ultrasonic sensors as described above have the following problems. In the foregoing ultrasonic sensor, the floored cylindrical case 52*a* is integrally constructed with the cylinder part 55 and the vibration part 54. While such an integrated case may be usually produced by machining, the inner diameter of the cylindrical case and the thickness of the vibration part are liable to variation in dimensions. Variation in dimensions of the inner diameter and thickness so greatly affect such characteristics of the ultrasonic sensor, such as resonance frequency, sensitivity and reverberation, that it becomes difficult to effectively produce the ultrasonic sensors with uniform characteristics, resulting in poor productivity. The machining process also brings about increases in cost of the ultrasonic sensor because of the expensive material employed.

A soft and fine copper wire is used for the input-output terminals 58*a* and 58*b* in the ultrasonic sensor with the foregoing construction from the view point of not adversely affecting the required vibration and reverberation characteristics of the vibration element. However, handling of the fine and soft input-output terminals is difficult. Also, it is very difficult to position the solder contact site against the piezoelectric vibration element. Consequently, the contact site becomes nonuniform among respective products thereby resulting in variation of the resonance frequency and sensitivity characteristic among the ultrasonic sensors. Therefore, effective production of an ultrasonic sensor with a uniform characteristic becomes difficult, resulting in poor mass productivity. Further, there is a possibility that the fine input-output terminals may be broken due to the effect of vibration of the piezoelectric vibration element, thereby adversely affecting the reliability of the electrical connection.

SUMMARY OF THE INVENTION

Accordingly, the object of the present invention is to solve the foregoing technical problems by providing a floored cylindrical case with easy machinability, uniform characteristics, cheap production cost, ready connectability of the input-output terminals to the piezoelectric vibration element and easy positioning of the contact site.

An ultrasonic sensor according to one embodiment comprises a floored cylindrical case, a piezoelectric vibration element disposed on the inner bottom floor of the floored cylindrical case and input-output terminals electrically connected to the piezoelectric vibration element and adapted to be electrically connected to the outside of the floored cylindrical case. The floored cylindrical case has a separately prepared cylinder part and a separately prepared vibration part, the cylinder part and the vibration part being adhered to each other with an adhesive material having an elastic modulus in the range from 100 through 20,000 kgf/mm$^2$ at a temperature range from 25 through 125° C.

Constructing the floored cylindrical case by integrating the separately formed cylinder part and vibration part allows the inner diameter of the floored cylindrical case and thickness of the vibration part to be produced with higher accuracy than producing a monolithic floored cylindrical case composed of a cylinder part and vibration part by machining. For example, mass-production of the cylinder part with a uniform inner diameter is made easy by using a resin mold while a vibration part with a uniform thickness can be formed by punching of a thin metal plate.

It is an important factor, however, to properly select an adhesive material for adhering the component parts since the floored cylindrical case is constructed by integrating the cylindrical part and vibration part. Selection of the adhesive material is important because the sensor according to the present invention is expected to be used under severe conditions as a component mounted on automobiles. It is essential for this purpose that the ultrasonic sensor substantially maintains its sensitivity and reverberation characteristics and not experience time-dependent deterioration even under severe conditions. Environmental reliability of the adhered site between the cylinder part and vibration part is one of the crucial factors for satisfying the conditions described above. With respect to this point, the inventors of the present invention have confirmed, as will be shown in the embodiments to be described hereinafter, that the desired sensitivity characteristic and reverberation characteristic can be satisfied under expected environmental conditions by adhering the cylinder part with the vibration part by using an adhesive material having an elastic modulus of 100 to 20,000 kgf/mm$^2$ in the temperature range from 25 through 125° C.

An ultrasonic sensor according to another embodiment of the invention comprises a floored cylindrical case, a piezoelectric vibration element disposed on the inner bottom floor of the floored cylindrical case and input-output terminals electrically connected to the piezoelectric vibration element and adapted to be electrically connected to the outside of the floored cylindrical case. The floored cylindrical case has a separately prepared cylinder part composed of an insulation member and a separately prepared vibration part composed of an electrically conductive member, at least one of the input-output terminals being buried into the cylinder part.

Burying the input-output terminals into the cylinder part enables the input-output terminals to be adequately fixed and supported with the cylinder part, thereby making it possible to more readily position the contact site for connecting the input-output terminals to the piezoelectric vibration element as compared with conventional ultrasonic sensors. It is also made possible to effectively produce the ultrasonic sensor with little variation in the location of the contact sites.

It becomes possible to use the wiring material composed of a highly rigid conductive material as the input-output terminal because the input-output terminals are fixed and supported with the cylinder part. In other words, the tip of the input-output terminals can be electrically connected without being directly pressed into contact with the piezoelectric vibration element even when a highly rigid conductive material is used since the conductive material is fixed and supported with the cylinder part. Electric continuity can be achieved without inhibiting (restricting) vibration of the piezoelectric vibration element and the vibration part by allowing the terminals to make contact with the piezoelectric vibration element and the vibration part via a conductive adhesive or solder by taking advantage of a spring action of the part of the input-output terminal projecting out of the portion buried into the cylinder part (i.e., the tip of the buried input-output terminal).

It is desirable that at least one of the input-output terminals be electrically connected to the piezoelectric vibration element at the side thereof not making contact with the vibration part.

While a conductive member is used for the vibration part in the ultrasonic sensor, an insulation member may be used for the vibration part. Although a certain means, for example connecting the terminals via a conductive adhesive or solder after forming a depression on the vibration part, should be devised in this case, advantages such as separately forming the cylinder part and vibration part and using a highly rigid electrically conductive material can still be attained.

The independently formed cylinder part and vibration part are preferably adhered with each other using an adhesive material having an elastic modulus of 100 to 20,000 kgf/cm$^2$ at a temperature range from 25 through 125° C. The elastic modulus of the cylinder part is preferably in the range of 100 to 20,000 kgf/cm$^2$ at a temperature range from 25 through 125° C. Furthermore, the elastic modulus of the vibration part is in the range of 100 to 20,000 kgf/cm$^2$ at a temperature range from 25 through 125° C. Using the cylinder part and vibration part, and the adhesive material for adhering both components, having elastic moduli as described above, allows changes in the sensitivity characteristic and reverberation characteristic to be substantially maintained and substantially prevents time dependent deterioration even when the sensor according to the present invention is used under a severe high temperature environment, such as being mounted on an automobile. Examples of materials, having the elastic modulus as prescribed above and suitable for use in the ultrasonic sensor according to the present invention, for forming the cylinder part include insulation materials such as polyphenylene sulfide, polyetherether ketone, polyether sulfone and liquid crystal polymers, while examples of the material for forming the vibration part are conductive materials such as aluminum.

The tip of the buried input-output terminals inside of the floored cylindrical case may have at least one or more bent portions. Forming at least one bent portion on the input-output terminal enables the tip of the buried input-output terminal to be longer, allowing improved spring action of the tip of the buried input-output terminal to reduce the inhibition (restriction) force against vibration.

The buried tip of the input-output terminals inside of the floored cylindrical case is preferably formed to have a length/thickness ratio of 2 or more and a length/width ratio of 2 or more. Making the tip of the buried input-output terminal to have such dimensional ratio enables the spring action of the tip of the input-output terminal to be improved to reduce the inhibition (restriction) force against vibration.

The tip of the buried input-output terminals inside of the floored cylindrical case may be formed into a tapered shape toward its tip direction or into a partially depressed shape. This enables the spring action of the tip of the buried input-output terminal to be improved to reduce the inhibition (restriction) force against vibration.

The inside of the floored cylindrical case may be at least partially filled with a foaming resin. The foaming resin suppresses excess vibration of the floored cylindrical case as well as absorbs excess ultrasonic waves generated in the case, thereby allowing improved reverberation characteristic of the ultrasonic sensor.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF PREFERRED EMBODIMENTS

Hereinafter, the preferred embodiments of the present invention are explained in detail with reference to the drawings.

First Embodiment

Figure 1:
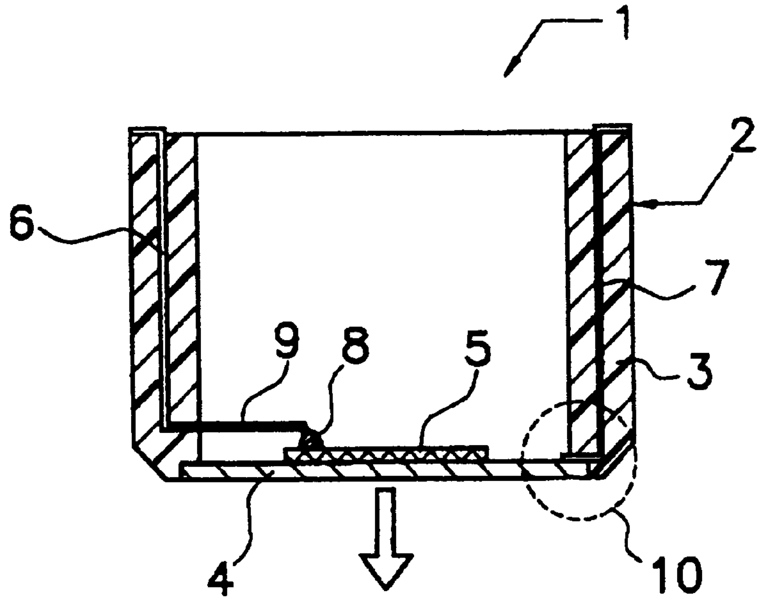
FIG. 1 is a cross section showing an ultrasonic sensor according to a first embodiment of the present invention.

Referring to FIG. 1, an ultrasonic sensor 1 comprises a floored cylindrical case 2 constructed of a separately formed insulative cylinder part 3 and a separately formed conductive vibration part 4 adhered to each other with an adhesive material 60. A thin plate of a piezoelectric vibration element 5, on both main faces of which element electrodes (not shown in the drawing) are formed, is disposed on the vibration part 4 corresponding to the inner bottom face of the floored cylindrical case 2. Note that although part 3 is referred to as the "cylinder part" and part 4 is referred to as the "vibration part", not only the vibration part 4 vibrates during operation of the ultrasonic sensor, but also the cylinder part 3 sometimes vibrates in harmony with vibration of the vibration part 4.

Two input-output terminals 6 and 7 composed of a highly rigid conductive member such as 42-nickel (an alloy of iron with 42% of nickel) are buried into the cylinder part 3. One end of the input-output terminal 6 is electrically connected to the element electrode formed on the top face of the piezoelectric vibration element 5 via a conductive adhesive 8. In making this electrical connection, the tip portion of the buried input-output terminal makes a light touch to the piezoelectric vibration element 5 by taking advantage of spring action of the buried tip portion 9 so as not to inhibit (restrict) the desired vibration of the piezoelectric vibration element 5 and vibration part 4. The tip 9 of the buried input-output terminal may be subjected to bending with an adequate angle so that the tip displays a proper spring action. The other end of the input-output terminal 6 extends to outside of the case 2 for electrical connection to auxiliary circuits. One end of the input-output terminal 7 is pressed and makes contact with the vibration part 4, as shown by the reference numeral 10 in FIG. 1, forming an electrical connection with the element electrode formed on the bottom face of the piezoelectric vibration element 5 via the vibration part 4. Like the terminal 6, the other end of the input-output terminal 7 also extends to outside of the case 2. A vibration suppressing material such as a silicone resin may be sometimes inserted into the empty space inside of the floored cylindrical case 2 of the foregoing ultrasonic sensor 1 in order to improve the reverberation characteristic.

A material having an elastic modulus of 100 to 20,000 $kgf/cm^2$ at a temperature range from 25 through 125° C. is desirable as the insulation member for use in the cylinder part 3. Examples of such a material are engineering plastics with good heat resistance and durability such as polyphenylene sulfide, polyetherether ketone, polyether sulfone and liquid crystal polymers.

A material having an elastic modulus of 100 to 20,000 $kgf/cm^2$ at a temperature range from 25 through 125° C. is also desirable as the conductive member for use in the vibration part 4. Examples of such a material include aluminum that is light-weight and easily machinable.

The reason why such materials having elastic moduli in the range as described above are used for the cylinder part 3 and the vibration part 4 is as follows. The ultrasonic sensor according to the present invention is expected to be used under a severe environment as a part mounted on an automobile. For that purpose, the sensor is required to substantially maintain its characteristics such as sensitivity and reverberation and not experience time-dependent deterioration even under severe environmental conditions. With respect to this point, the inventors of the present invention have confirmed that the desired sensitivity characteristic and reverberation characteristic can be satisfied under the expected environmental conditions by using the materials having elastic moduli within the foregoing range.

FIGS. 3A, 3B, 4A and 4B are the graphs indicating the relation of the elastic moduli of the materials to be used for the vibration part against the sensitivity and reverberation of the ultrasonic sensor. It is evident from the respective graphs that the reverberation characteristic steeply turns to favorable values at elastic moduli of 100 $kgf/mm^2$ or more, and that the reverberation characteristic remains very good up to elastic moduli of 20,000 $kgf/mm^2$ or below. When the ultrasonic sensor, in which the floored cylindrical case is constructed using the material having elastic moduli within the range as described above for the respective cylinder part and vibration part, is used for a prescribed time period under expected environmental conditions, it was confirmed that characteristic changes well remained within the allowable range.

Figure 5A:
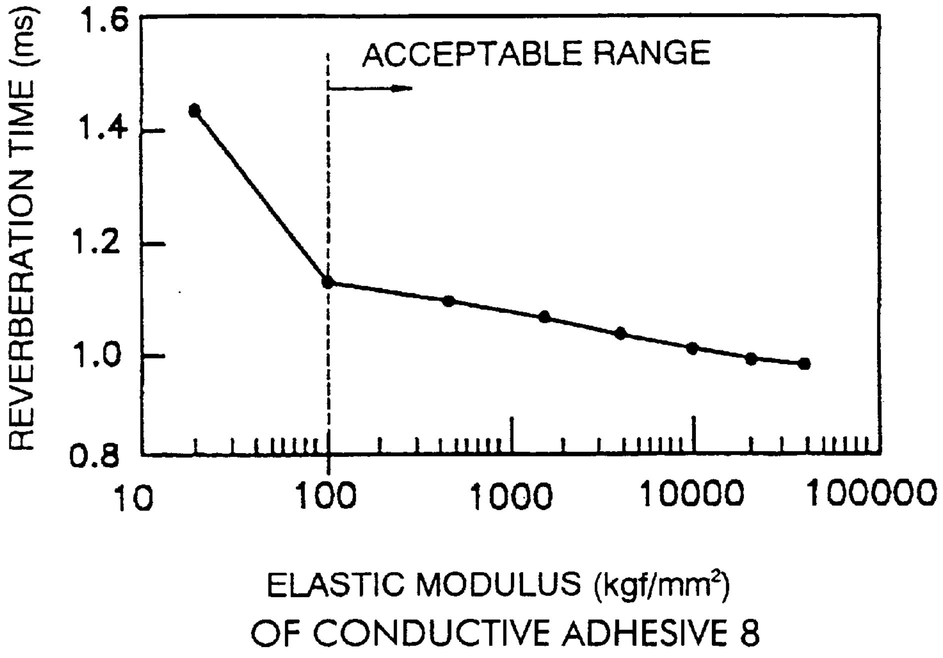
FIGS. 5A and 5B are graphs showing the relation of the elastic modulus of the adhesive material to reverberation of the ultrasonic sensor and the relation of the elastic modulus of the adhesive material to sensitivity of the ultrasonic sensor, respectively.
Figure 5B:
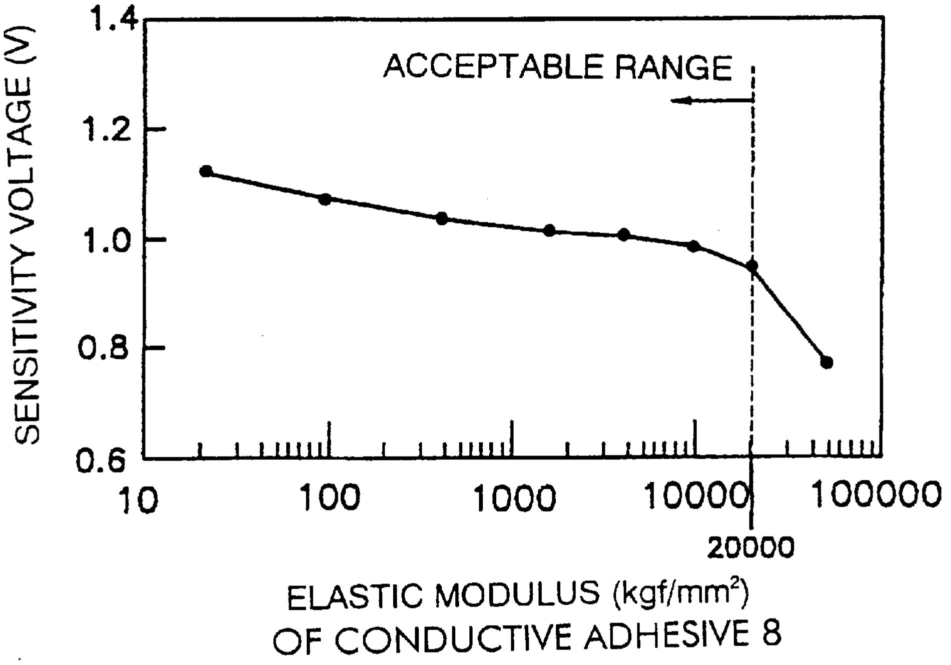

It is also confirmed that for the adhesive materials to be used for adhering the cylinder part 3 and vibration part 4 to each other adhesive materials having elastic moduli of 100 to 20,000 kgf/cm$^2$ within the temperature range from 25 to 125° C. are preferable. The relation of the elastic modulus of the adhesive material against the sensitivity and reverberation is shown in the graphs of FIGS. 5A and 5B. It is evident from these graphs that the material with the values within the range described previously provides desirable results.

The ultrasonic sensor 1 with a construction as described above is produced as follows.

At first, a cylinder part 3 in which the input-output terminals 6 and 7 are buried, is formed by injection molding. The vibration part is also separately prepared by punching an aluminum plate and the piezoelectric vibration element 5 is adhered and fixed on the vibration part 4 with a solder or a conductive adhesive while the cylinder part 3 and vibration part 4 remain still separated with each other. Then, the cylinder part 3 and vibration part 4 are integrated by adhering one to the other with the adhesive material 60, thereby constructing the floored cylindrical case 2. The input-output terminals 6 and 7 are put into electrical connection using a solder or conductive adhesive when necessary, followed by inserting the vibration suppressing material into the floored cylindrical case 2, if necessary. Bending of the input-output terminals may be applied either before or after the injection molding of the cylinder part 3, or it may be carried out after integrating the cylinder part 3 and vibration part 4.

The operation of the ultrasonic sensor 1 is as follows. Firstly, a driving voltage is impressed on the input-output terminals 6 and 7 to allow the piezoelectric vibration element 5 to vibrate. The vibration part 4 is vibrated in harmony with vibration of the piezoelectric vibration element 5, emitting an ultrasonic wave toward the arrow direction shown in FIG. 1. After a prescribed time interval, the ultrasonic wave reflected back from the sensed object reaches to the piezoelectric vibration element 5 via the vibration part 4 and is converted into reflection signals, which are transmitted from the input-output terminals 6 and 7. The time interval from impression of the driving voltage through output of the reflection signals is then detected to measure the distance from the sensor to the sensed object from the results of measurement.

The ultrasonic sensor with the construction as hitherto described makes it possible to produce cylinder parts and vibration parts having high dimensional accuracy cheap with good mass-productivity by assembling separately formed cylinder parts and vibration parts into floored cylindrical cases. Burying the input-output terminals into the cylinder part allows the input-output terminals to be fixed to the cylinder part, thereby making the positioning work of the contact site easy in connecting the input-output terminals to the piezoelectric vibration element, along with making it possible to effectively produce ultrasonic sensors having uniform characteristics. Highly rigid conductive members can be used for the input-output terminals since the input-output terminals are fixed at the cylinder part.

Figure 2:
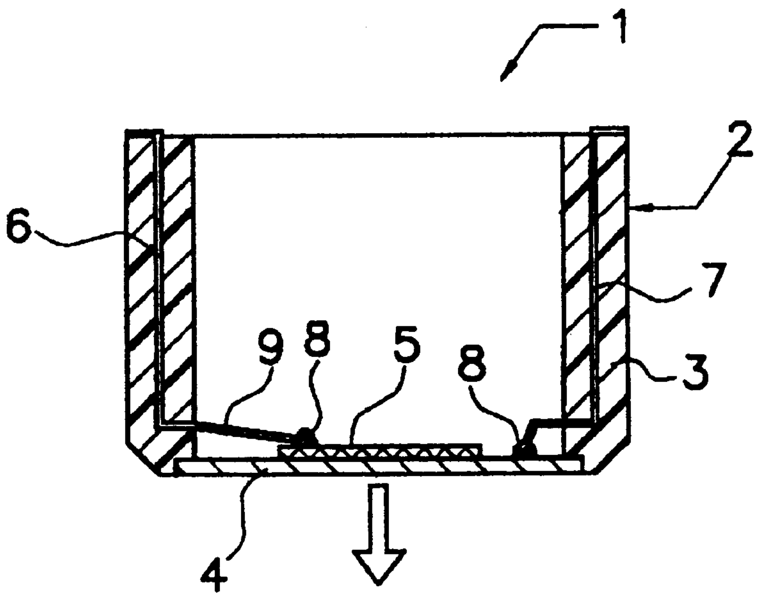
FIG. 2 is a cross section showing a variation of the ultrasonic sensor according to the first embodiment of the present invention.
Figure 3A:
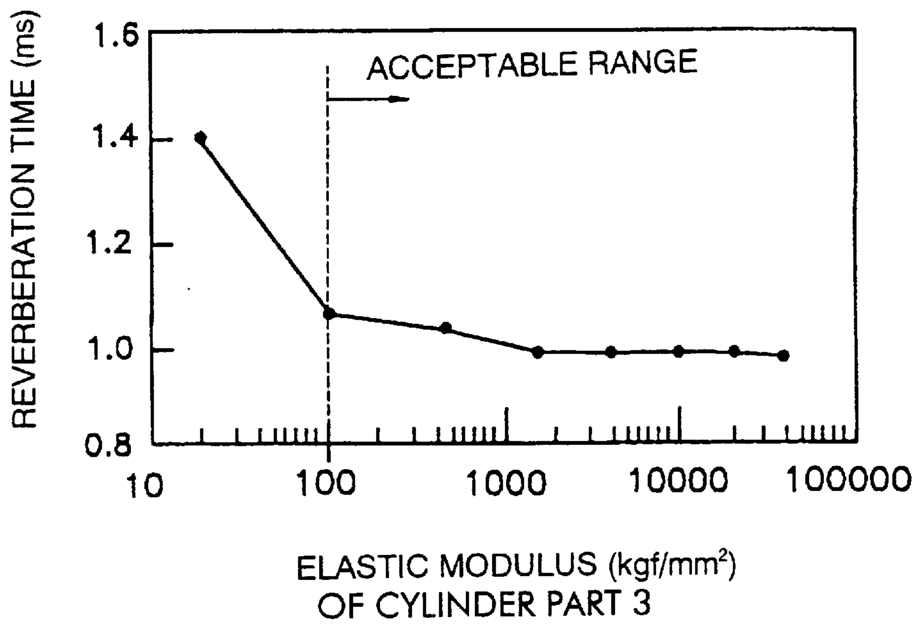
FIGS. 3A and 3B are graphs showing the relation of the elastic modulus of the cylinder part to reverberation of the ultrasonic sensor and the relation of the elastic modulus of the cylinder part to sensitivity of the ultrasonic sensor, respectively.
Figure 3B:
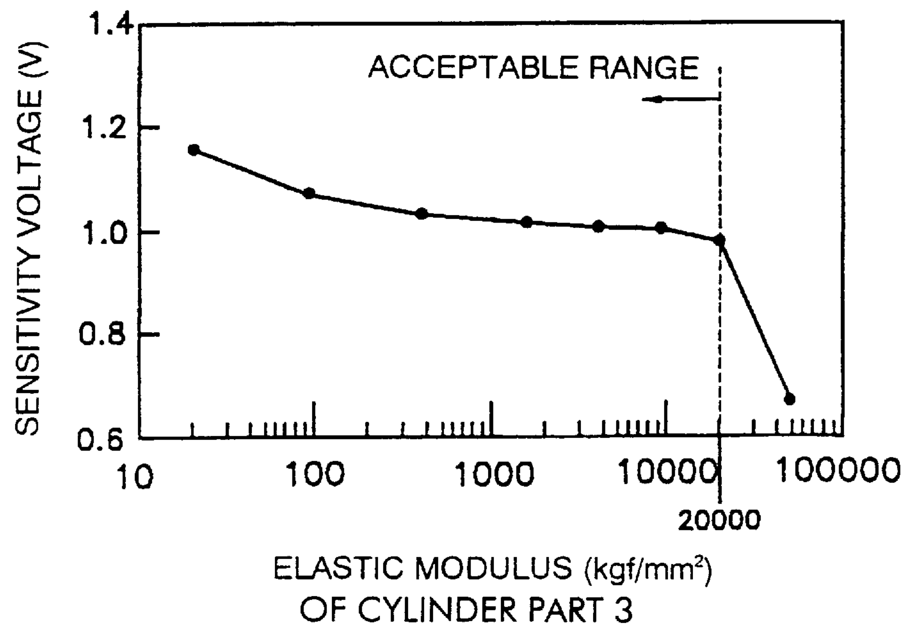
Figure 4A:
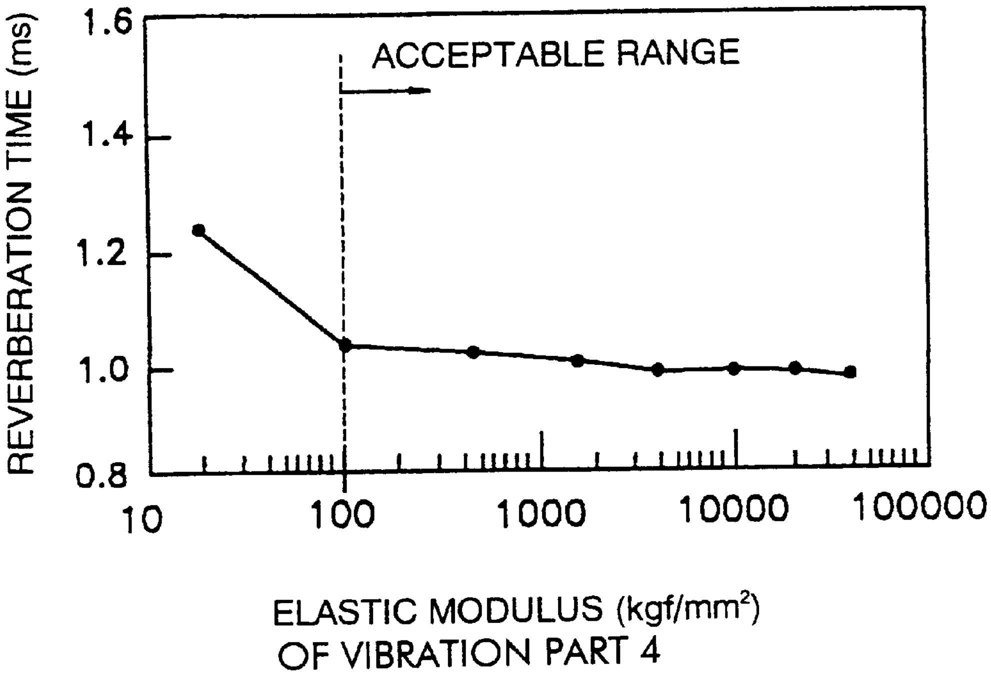
FIGS. 4A and 4B are graphs showing the relation of the elastic modulus of the vibration part to reverberation of the ultrasonic sensor and the relation of the elastic modulus of the vibration part to sensitivity of the ultrasonic sensor, respectively.
Figure 4B:
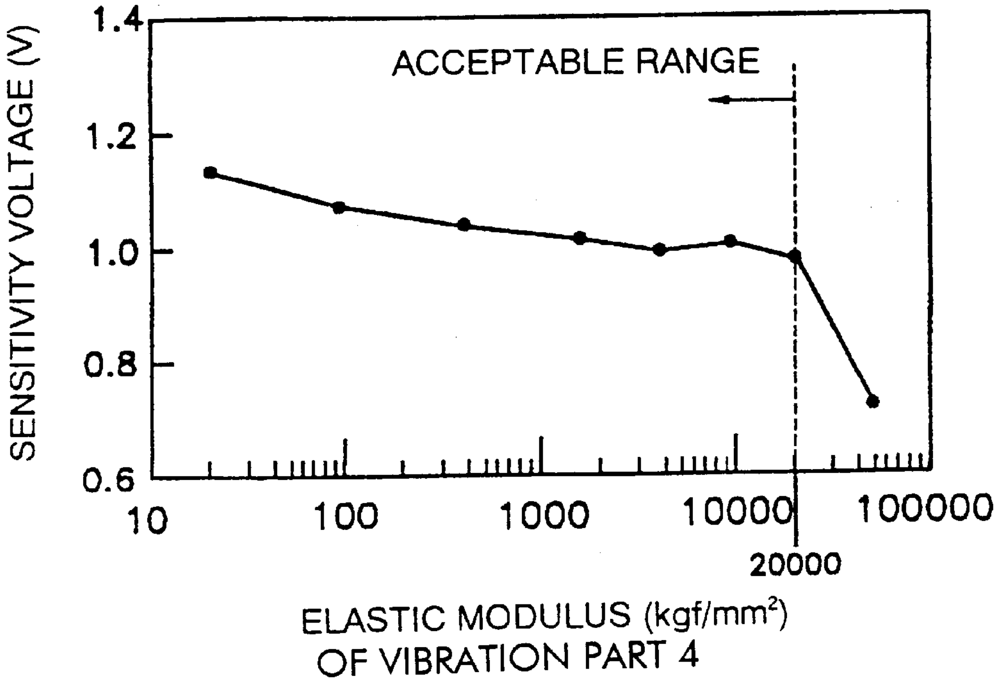

While the element electrodes are formed on both main faces of the piezoelectric vibration element 5 in the present embodiment, for example, it is not always necessary that the element electrodes are formed on the main face at the side making a contact with the vibration part 4, because it is also possible to allow the vibration part 4, comprising a conductive member, to function as the element electrode. While 42-nickel was used for the lead wire material of the input-output terminals, use of nickel silver or phosphor bronze as similar highly rigid lead wire materials are also possible. Use of conventional fine copper wire, as well as wire materials with high rigidity is also possible. Positioning is made easier than usual in connecting a fine wire to the piezoelectric vibration element 5 since the fine wire is buried into the cylinder part 3 to substantially fix and support it. Furthermore, while both of the two input-output terminals are buried into the cylinder part 3 in the present embodiment, only one can be buried. In addition, the methods for connecting the input-output terminals 6 and 7 are not limited to that shown in the embodiment of FIG. 1. For example, the input-output terminal 7, like the terminal 6, may be passed through the side wall portion of the cylinder part 3 to connect to the vibration part 4 using a conductive adhesive 8 as shown in FIG. 2. Many embodiments are also possible for the method for bending the input-output terminals. As for connection of the cylinder part 3 with the vibration part 4, connection between them may be carried out by soldering or welding instead of adhesion with adhesives.

Second Embodiment

Figure 6:
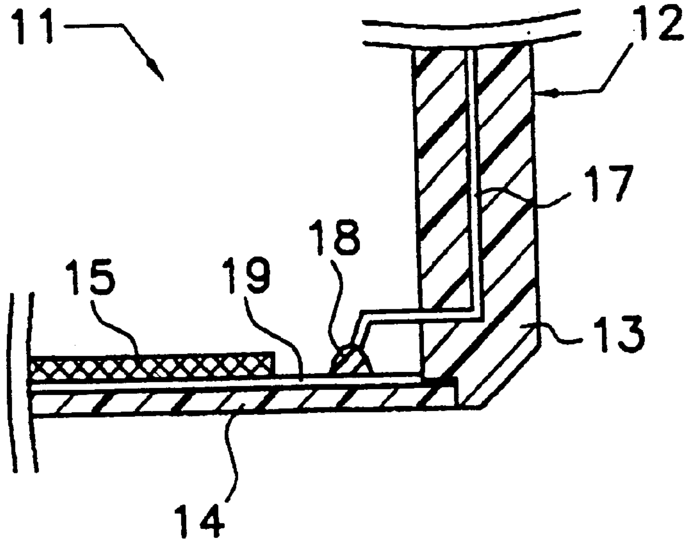
FIG. 6 is a partially enlarged cross section showing an ultrasonic sensor according to a second embodiment of the present invention.

As shown in FIG. 6, an ultrasonic sensor 11 according to a second embodiment of the present invention is, like the ultrasonic sensor 1 according to the first embodiment, constructed of a floored cylindrical case 12 in which a separately formed cylinder part 13 and a separately formed vibration part 14 are integrated by adhering one to the other using an adhesive material 60. Different from the first embodiment, the present embodiment is characterized in that not only the cylinder part 13 but also the vibration part 14 is formed of an insulation material. The insulation materials for the cylinder part 13 and the vibration part 14 and the adhesive material 60 are the same as those explained in the first embodiment. A thin plate of piezoelectric vibration element 15 on both main faces of which element electrodes (not shown in the drawing) are formed, is disposed on the vibration part 14 corresponding to the inner bottom face of the floored cylindrical case 12.

The vibration part 14 of the ultrasonic sensor 11 according to the second embodiment is formed of an insulation member. Accordingly, a conductive film 19 is formed on the surface at the inner side of the vibration part 14 for electrical connection between the input-output terminal 17 and the element electrode at the lower face side of the piezoelectric vibration element 15. More specifically, the tip of the input-output terminal 17 is electrically connected to the conductive film 19 with a conductive adhesive 18, thereby putting the tip of the input-output terminal 17 into electrical connection with the element electrode at the bottom face side of the piezoelectric vibration element 15 which is electrically connected to the conductive film 19. Explanation of the other constructions are omitted since they are not different from the ultrasonic sensor according to the first embodiment.

According to the ultrasonic sensor with the construction as described above, although the construction of the electrical connection between the input-output terminal 17 and piezoelectric vibration element 15 becomes somewhat complicated as compared with the piezoelectric sensor according to the first embodiment, it is made possible to cheaply produce the cylinder part 13 and vibration part 14 having a high dimensional accuracy with good mass-productivity. Moreover, since the input-output terminals 17 are fixed at the cylinder part 13 by burying the input-output terminals into the cylinder part 13, positioning of the connection site becomes easy, i.e., it is easy to put the input-output terminals into electrical connection with the piezoelectric vibration element 15. This allows an ultrasonic sensor with uniform characteristics to be effectively produced.

Figure 7:
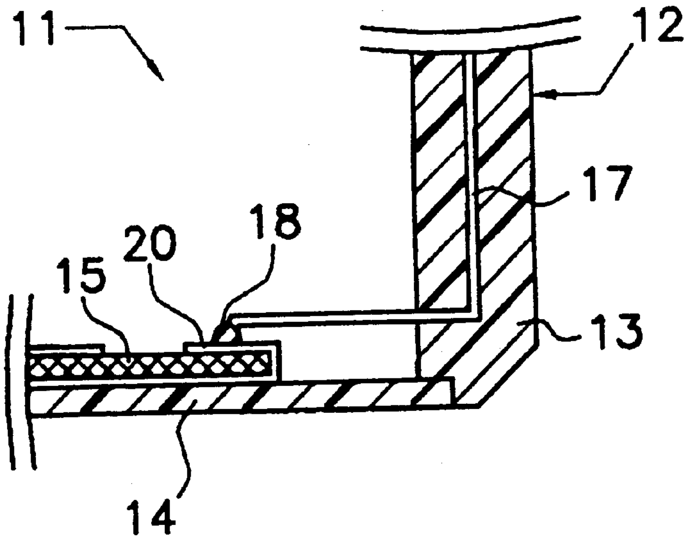
FIG. 7 is a partially enlarged cross section showing a first variation of the ultrasonic sensor according to the second embodiment of the present invention.
Figure 8:
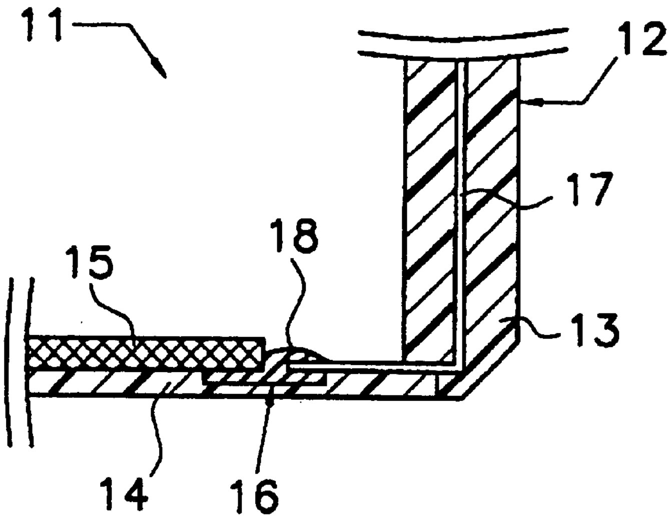
FIG. 8 is a partially enlarged cross section showing a second variation of the ultrasonic sensor according to the second embodiment of the present invention.

The method for electrically connecting the element electrodes at the bottom face side of the piezoelectric vibration element 15 to the input-output terminals are not necessarily limited to the methods described above. For example, as shown in FIG. 7, the element electrode 20 may be put into electrical connection with the input-output terminal 17 after elongating the element electrode 20 up to the top face side via the side portion of the piezoelectric vibration element 15. Or, it is also possible that, as shown in FIG. 8, the conductive adhesive 18 is placed in a depression 16 formed in the vibration part 14, followed by putting the element electrode (not shown in the drawing) at the bottom face side into electrical connection with the input-output terminal 17 via the adhesive 18.

Third Embodiment

Figure 9:
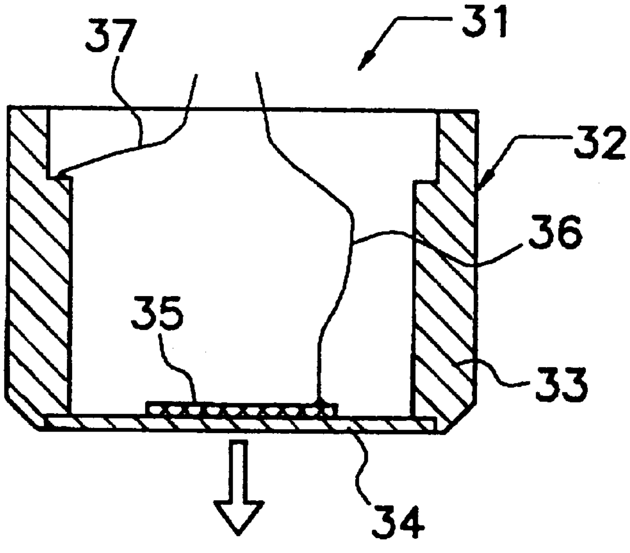
FIG. 9 is a cross section showing an ultrasonic sensor according to a third embodiment of the present invention.

An ultrasonic sensor 31 according to a third embodiment comprises a floored cylindrical case 32 in which a separately formed cylinder part 33 and a separately formed vibration part 34 are integrated by adhering them together with an adhesive material 60 as shown in FIG. 9. Different from the first embodiment, the present embodiment is characterized in that both the cylinder part 33 and the vibration part 34 are formed of a conductive material. The conductive materials for the cylinder part 33 and vibration part 34 and the adhesive material are the same as those explained in the first embodiment. A thin plate of a piezoelectric vibration element 35, on both sides of which element electrodes (not shown in the drawing) are formed, is disposed on the vibration part 34 corresponding to the inner bottom face of the floored cylindrical case 32.

Since the cylinder part 33 is formed of a conductive member in the present embodiment, it is difficult to bury the input-output terminals 36 and 37 into the cylinder part as in the foregoing respective embodiments. Accordingly, the element electrode (not shown in the drawing) formed on both main faces of the piezoelectric vibration element 35 is put into electrical connection to outside of the case 32 using the same method as in the prior art. Actually, the input-output terminals 36 and 37 comprising a fine wire of copper are adhered with a solder or conductive adhesive to the element electrodes on the top face of the piezoelectric vibration element 35 or to the prescribed side of the floored cylindrical case put into electrical connection with the element electrodes on the bottom face of the piezoelectric vibration element. Description of the other constructions is omitted since they are the same as those of the ultrasonic sensor according to the first embodiment.

The ultrasonic sensor having the construction as described above is forced to form electrical connection using a fine copper wiring as in the prior art due to the difficulty of burying the input-output terminals into the cylinder part because the cylinder part is formed of a conductive member. Thus, positioning of the contact site becomes difficult. However, because the cylinder part 33 and vibration part 34 are separately formed, high dimensional accuracy can be cheaply produced with good productivity.

It is possible for the ultrasonic sensor according to the present invention to form the cylinder part 33 with a conductive material and the vibration part 34 with an insulation material. Although the method for forming electrical connection from the element electrode at the bottom side of the piezoelectric vibration element 35 becomes a little bit more complicated as compared with the case when a conductive material is used for the vibration part 34, the advantage of separately forming the cylinder part 33 and the vibration part still results.

Fourth Embodiment

An ultrasonic sensor 41 according to a fourth embodiment of the present invention is characterized in that the tip 9 of the buried terminal corresponding to the tip in the ultrasonic sensor according to the first embodiment is endowed with a proper spring action by varying the shape of the tip 9 of the buried input-output terminal 6.

Figure 10:
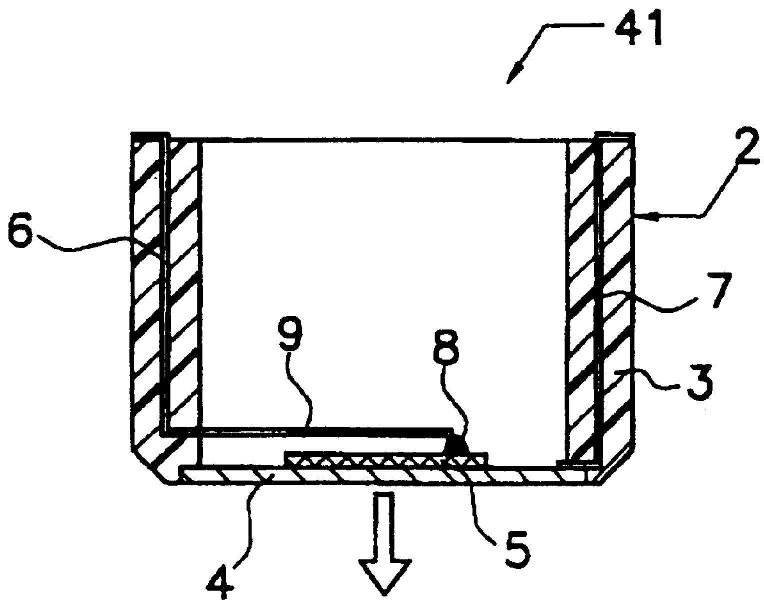
FIG. 10 is a cross section showing an ultrasonic sensor according to a fourth embodiment of the present invention.

The tip 9 of the buried terminal projecting out of the cylinder part 3 is formed to be a little longer in the ultrasonic sensor 41 as shown in FIG. 10. Since forming the tip 9 of the buried terminal longer allows its spring action to be enhanced, the inhibition (restriction) force of the input-output terminal 6 against vibration of the piezoelectric vibration element 5 and vibration part 4 is weakened, thereby improving the sensitivity characteristic of the ultrasonic sensor 41.

Figure 11:
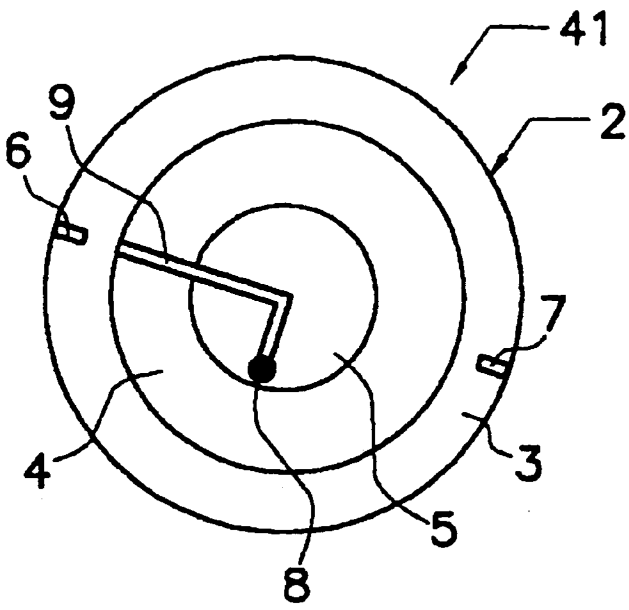
FIG. 11 is a plan view showing a first variation of the ultrasonic sensor according to the fourth embodiment of the present invention.

The method for improving the spring action of the tip 9 of the buried terminal includes, in addition to the method as hitherto described, providing a bent portion at the tip 9 of the buried terminal as shown in FIG. 11 viewed from the axial direction of the floored cylindrical case 2. Providing a bent portion allows the tip 9 of the buried terminal to be longer, serving for improving its spring action. The shape of the bent portion includes, besides the L-shape as shown in FIG. 11, a variety of shapes such as a U-shape, meandering shape or spiral shape.

Figure 12:
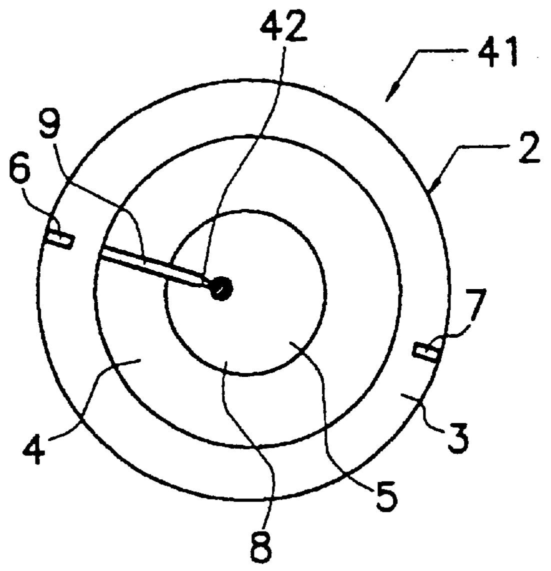
FIG. 12 is a plan view showing a second variation of the ultrasonic sensor according to the fourth embodiment of the present invention.

Otherwise, a tapered portion 42 that makes the tip 9 of the buried terminal gradually slender may be provided, for example, as shown in FIG. 12. the shape of this tapered portion 42 is not limited to the shape shown in FIG. 12 but a step shape or a rounded shape may be used, or a slender depression may be partially provided at the tip 9 of the buried terminal.

Figure 13:
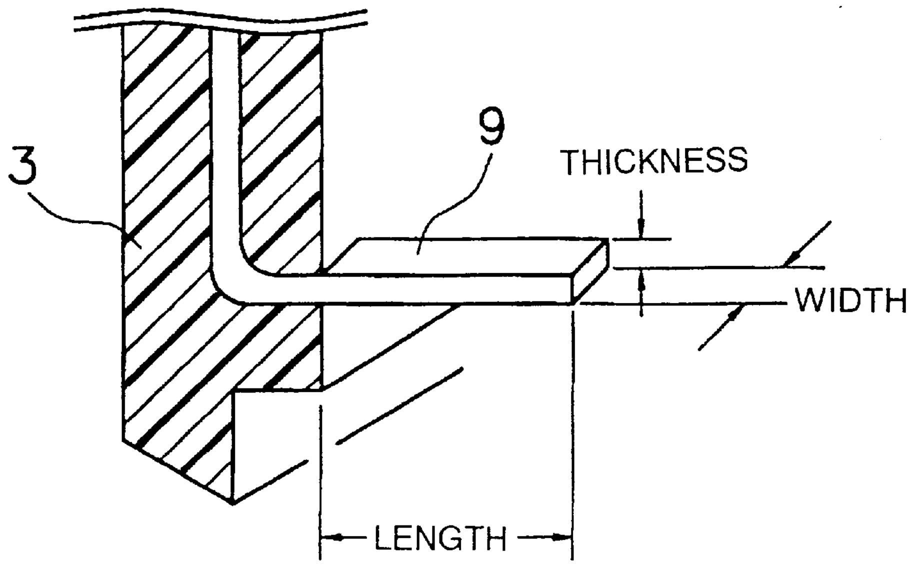
FIG. 13 is a partially enlarged cross sectional perspective view showing a third variation of the ultrasonic sensor according to the fourth embodiment of the present invention.

It is also possible to improve the spring action by appropriately selecting the dimensional ratio of the tip 9 of the buried terminal. For example, a good spring action of the tip 9 of the buried terminal can be obtained by adjusting the length/thickness ratio or the length/width ratio to 2 or more, respectively, after setting each dimension of the tip 9 of the buried terminal as shown in FIG. 13.

Figure 14A:
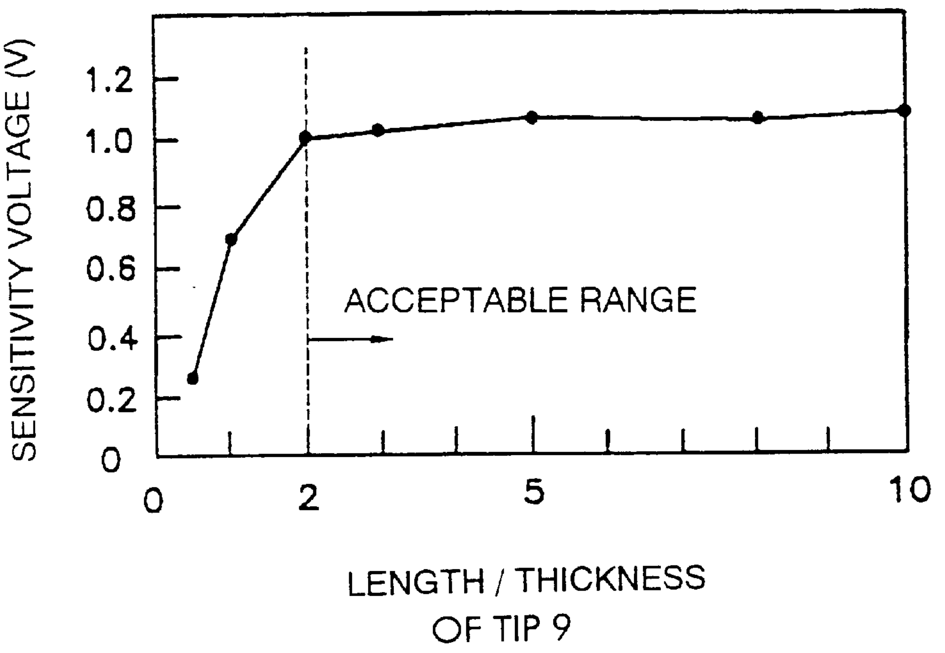
FIGS. 14A and 14B are graphs showing the relation of the length/thickness ratio to sensitivity voltage of the ultrasonic sensor and the relation of the length/width ratio to sensitivity voltage of the ultrasonic sensor, respectively.
Figure 14B:
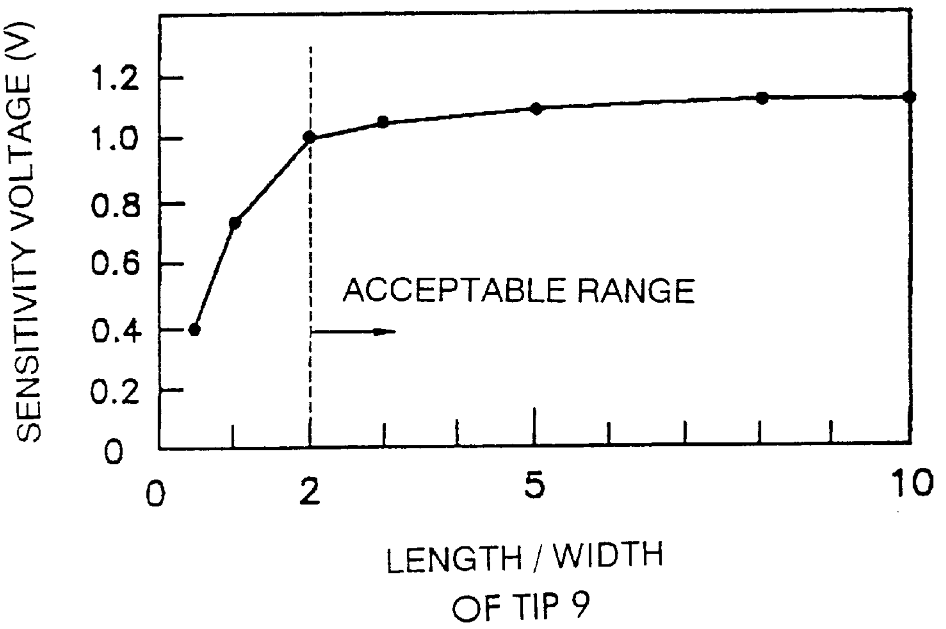

FIGS. 14A and 14B are graphs showing the relation of the length/thickness ratio and length/width ratio to sensitivity of the ultrasonic sensor 41. It is evident from the graph that the sensitivity characteristic clearly shows good values up to the point where the length/thickness ratio and the length/width ratio is 2 or more, respectively. However, if it is desired to obtain an ultrasonic sensor with higher sensitivity, the length/thickness ratio and the length/width ratio may be 5 or more, respectively.

While each of the input-output terminals assumes a plate shape in the present embodiment, they are not necessarily limited to this shape but a cylindrical shape is also acceptable. The spring action of the tip 9 of the buried terminal can be also improved by assuming the dimensional ratio as described above. The methods for improving spring action do not have to be used alone but may be used in combination.

Fifth Embodiment

An ultrasonic sensor 45 according to a fifth embodiment of the present invention is characterized in that, different from the ultrasonic sensor in the first embodiment, the floored cylindrical case 2 is filled with a foaming resin 46.

Figure 15:
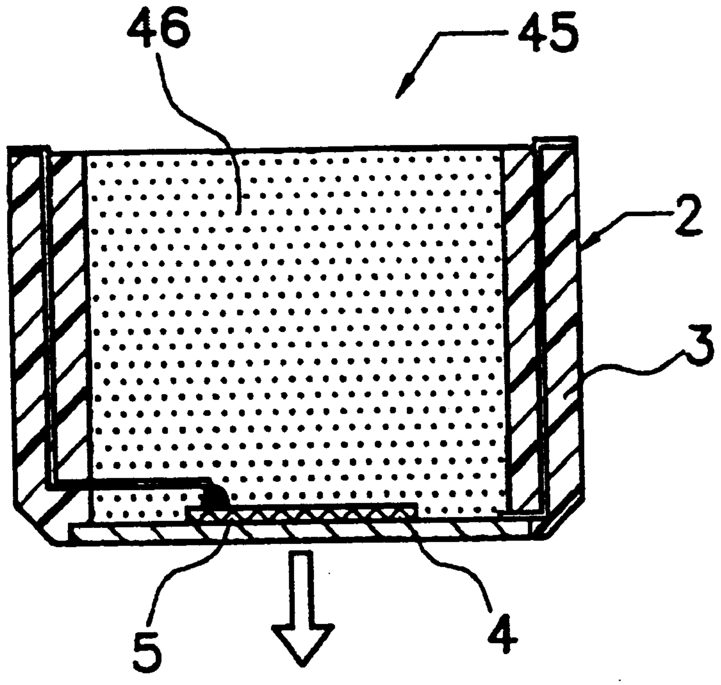
FIG. 15 is a cross section showing an ultrasonic sensor according to a fifth embodiment of the present invention.

The foaming resin 46 is filled in the entire inner space of the floored cylindrical case 2 as shown in FIG. 15. A force to press the cylinder part 3 from inside toward outside is applied due to expansion of the resin 46 when the interior of the floored cylindrical case 2 is filled with the foaming resin 46 so that excess vibration of the cylinder part 3 is suppressed. In other words, while vibration of the piezoelectric vibration element 5 allows not only the vibration part 4 but also the cylinder part 3 to harmoniously vibrate, vibration of the cylinder part 3 may be excessive and cause deterioration of the reverberation characteristic of the ultrasonic sensor. The reverberation characteristic can be improved by suppressing this excess vibration of the cylinder part 3 with expansion force of the foaming resin 46. The term "fill" as used herein refers not only to allowing the foaming resin liquid to flow into the floored cylindrical case 2 but also to inserting the solidified foaming resin into the case 2.

Figure 16A:
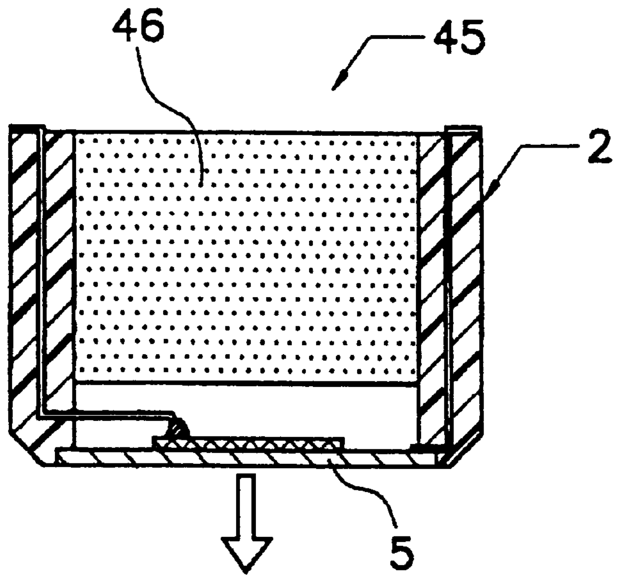
FIGS. 16A and 16B are cross sections showing a variation of the ultrasonic sensor according to the fifth embodiment of the present invention.
Figure 16B:
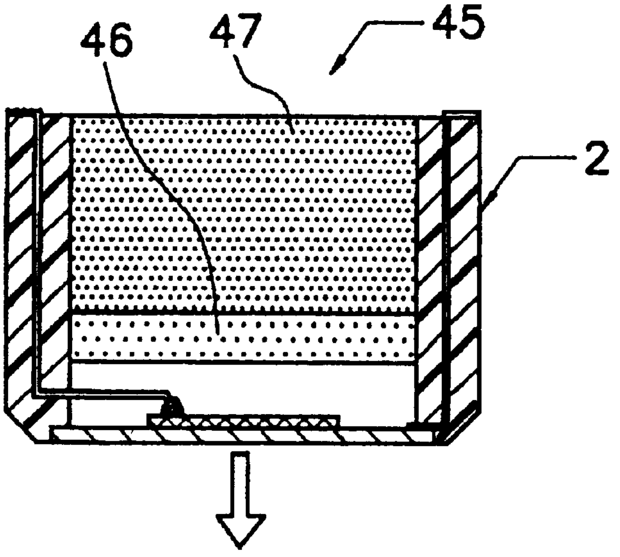
Figure 17:
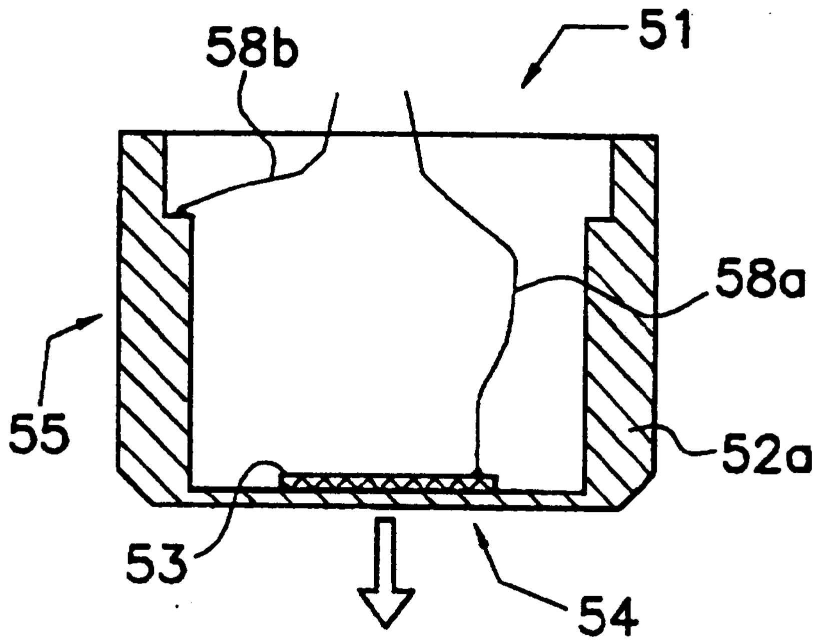
FIG. 17 PRIOR ART
FIG. 17 is a cross section showing the ultrasonic sensor in the prior art.

The method for filling the foaming resin 46 is not limited to the embodiment shown in FIG. 15. In FIG. 16A, for example, the foaming resin 46 that has been solidified at outside of the case 2 is inserted and fixed in the floored cylindrical case 2 while an empty space remains above the piezoelectric vibration element 5. Disposing the foaming resin 46 with an empty space above the piezoelectric vibration element 5 prevents the foaming resin 46 from inhibiting (restricting) vibration of the piezoelectric vibration element 5 and, thus, enables a good sensitivity characteristic to be maintained. In FIG. 16B, the foaming resin 46 solidified at outside of the case 2 is inserted into and fixed in the case with an empty space above the piezoelectric vibration element 5, followed by filling a vibration suppressing material 47 such as a silicone resin on the foaming resin 46. Filling the vibration suppressing material 47 with high density on the foaming resin 46 enables vibration suppressing effect of the case 2 to be enhanced.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An ultrasonic sensor comprising:

a floored cylindrical case having a separately prepared cylinder part and a separately prepared vibration part, the cylinder part and the vibration part being adhered to one another with an adhesive material having an elastic modulus in the range from 100 through 20,000 kgf/mm$^2$ at a temperature range from 25 through 125° C.;

a piezoelectric vibration element disposed on an inner bottom floor of the floored cylindrical case; and input-output terminals electrically connected to the piezoelectric vibration element and adapted to be electrically connected outside of the floored cylindrical case.

2. An ultrasonic sensor comprising:

a floored cylindrical case constructed of a combination of a separately prepared cylinder part and a separately prepared vibration part;

a piezoelectric vibration element disposed on an inner bottom floor of the floored cylindrical case; and input-output terminals electrically connected to the piezoelectric vibration element and adapted to be electrically connected outside of the floored cylindrical case, wherein the cylinder part is composed of an insulation material and each of the input-output terminals has a portion encased within the cylinder part.

3. An ultrasonic sensor comprising:

a floored cylindrical case having a separately prepared cylinder part composed of an insulation member and a separately prepared vibration part composed of an electrically conductive member;

a piezoelectric vibration element disposed on an inner bottom floor of the floored cylindrical case; and input-output terminals electrically connected to the piezoelectric vibration element and adapted to be electrically connected outside of the floored cylindrical case, wherein each of the input-output terminals has a portion encased within the cylinder part.

4. An ultrasonic sensor according to claim 2, wherein the cylinder part and the vibration part are adhered together with an adhesive material having an elastic modulus in the range of 100 through 20,000 kgf/mm$^2$ at a temperature range from 25 through 125° C.

5. An ultrasonic sensor according to claim 3, wherein the cylinder part and the vibration part are adhered together with an adhesive material having an elastic modulus in the range of 100 through 20,000 kgf/mm$^2$ at a temperature range from 25 through 125° C.

6. An ultrasonic sensor according to one of claim 1 through claim 5, wherein an elastic modulus of the cylinder part is in the range of 100 to 20,000 kgf/mm$^2$ at a temperature range from 25 through 125° C.

7. An ultrasonic sensor according to one of claim 1 through claim 5, wherein an elastic modulus of the vibration part is in the range of 100 to 20,000 kgf/mm$^2$ at a temperature range from 25 through 125° C.

8. An ultrasonic sensor according to one of claim 1 through claim 5, wherein the input-output terminals are made of at least one of nickel silver, iron-nickel alloy or phosphor bronze.

9. An ultrasonic sensor according to one of claim 2 through claim 5, wherein at least one of the input-output terminals has a tip within the cylindrical case with at least one bent portion.

10. An ultrasonic sensor according to one of claim 2 through claim 5, wherein at least one of the input-output terminals has a tip within the cylindrical case with a length/thickness ratio of 2 or more and a length/width ratio of 2 or more.

11. An ultrasonic sensor according to one of claim 2 through claim 5, wherein at least one of the input-output terminals has a tip within the cylindrical case which is formed into a tapered shape.

12. An ultrasonic sensor according to one of claim 2 through claim 5, wherein the inside of the floored cylindrical case is at least partially filled with a foaming resin.

13. An ultrasonic sensor according to one of claim 1 through claim 5, wherein the piezoelectric vibration element has a first face in contact with the vibration part, a first one of the input-output terminals is electrically connected to the vibration part and a second one of the input-output terminals is electrically connected to a second face of the piezoelectric vibration element opposite to the first face.

14. An ultrasonic sensor according to one of claim 1 through claim 5, wherein at least one of the input-output terminals has a tip which is buried in a depression formed in the vibrating part.

* * * * *